US005968157A

United States Patent [19]
Joy et al.

[11] Patent Number: 5,968,157
[45] Date of Patent: Oct. 19, 1999

[54] LOCKING OF COMPUTER RESOURCES

[75] Inventors: William N. Joy, Aspen, Colo.; James Michael O'Connor, Mountain View; Marc Tremblay, Palo Alto, both of Calif.

[73] Assignee: Sun Microsystems, Inc., Palo Alto, Calif.

[21] Appl. No.: 08/788,808

[22] Filed: Jan. 23, 1997

[51] Int. Cl.$^6$ .................................................. G06F 9/46
[52] U.S. Cl. ........................................... 710/200; 710/108
[58] Field of Search .................................... 395/726, 288, 395/287, 200.43, 200.59; 711/150, 152; 710/200, 108, 107; 709/210, 229

[56] References Cited

U.S. PATENT DOCUMENTS

| 4,435,766 | 3/1984 | Haber et al. | 364/300 |
| 5,261,108 | 11/1993 | Hideo et al. | 395/725 |
| 5,263,161 | 11/1993 | Barth et al. | 711/152 |
| 5,341,491 | 8/1994 | Ramanujan | 711/152 |
| 5,375,241 | 12/1994 | Walsh | 395/685 |
| 5,535,365 | 7/1996 | Barriuso et al. | 711/155 |
| 5,574,922 | 11/1996 | James | 395/561 |
| 5,592,673 | 1/1997 | Kurabayashi et al. | 395/726 |
| 5,594,907 | 1/1997 | Tanaka | 395/750.06 |
| 5,623,673 | 4/1997 | Gephardt et al. | 395/733 |
| 5,669,002 | 9/1997 | Buch | 395/726 |
| 5,737,545 | 4/1998 | Wszolek et al. | 395/288 |

OTHER PUBLICATIONS

Catanzaro, Ben, "Multiprocessor System Architectures" (SunSoft Press, 1994) pp. 232–233.

Lindhollm, Tim, et al., "The Java™ Virtual Machine Specification" (Addison–Wesley Publishers, 1997).

Catanzaro, Ben, "Multiprocessor System Architectures" (SunSoft Press, 1994), pp. 251–253.

Wayner, Peter, "Sun Gambles on Java Chips", *Byte,* Nov. 1996, pp. 79–82, 84, 86, and 88.

*Primary Examiner*—Gopal C. Ray
*Attorney, Agent, or Firm*—Skjerven Morrill MacPherson Franklin & Friel LLP; Michael Shenker

[57] ABSTRACT

A computer processor includes a number of register pairs LOCKADDR/LOCKCOUNT. In each pair, the LOCKADDR/LOCKCOUNT register is to hold a value that identifies a lock for a computer resource. When a lock instruction issues, the corresponding LOCKCOUNT register is incremented. When an unlock instruction issues, the corresponding LOCKCOUNT register is decremented. The lock is freed when a count associated with the LOCKCOUNT register is decremented to zero. This scheme provides fast locking and unlocking in many frequently occurring situations. In some embodiments, the LOCKCOUNT registers are omitted, and the lock is freed on any unlock instruction corresponding to the lock. In some embodiments, a computer object includes a header which includes a pointer to a class structure. The class structure is aligned on a 4-byte boundary, and therefore two LSBs of the pointer to the class structure are zero and are not stored in the header. Instead, two header LSBs store: (1) a LOCK bit indicating whether the object is locked, and (2) a WANT bit indicating whether a thread is waiting to acquire a lock for the object.

53 Claims, 4 Drawing Sheets

144

| THREAD_ID | LOCKADDR | LOCKCOUNT |
|---|---|---|
| THREAD_ID0 | LOCKADDR0 | LOCKCOUNT0 |
| THREAD_ID1 | LOCKADDR1 | LOCKCOUNT1 |
| THREAD_ID2 | LOCKADDR2 | LOCKCOUNT2 |
| THREAD_ID3 | LOCKADDR3 | LOCKCOUNT3 |
|  |  |  |

FIG. 4

LOCKING OF COMPUTER RESOURCES

BACKGROUND OF THE INVENTION

The present invention relates to locking of computer resources.

When different computer entities such as computer processes or threads share a computer resource (for example, data, code, or a piece of hardware), it may be desirable to allow one of the computer entities to lock a resource for a while to prevent some types of access to the resource by other computer entities. For example, if two or more threads share computer data, and one thread has started but not finished to modify the data when another thread is accessing the data, the other thread may get incorrect information from the data and/or the data could be corrupted by the two threads. Also, if one thread has started but not finished execution of a critical code section when another thread starts executing the same code section, execution errors may occur if, for example, the critical code section modifies the state of a data area, a hardware controller, or some other computer resource. Therefore, locking techniques have been provided to allow computer entities to lock computer resources.

It is desirable to provide fast techniques for locking of computer resources.

SUMMARY

The present invention provides methods and circuits that allow locking and unlocking of computer resources to be fast in many frequently occurring situations. In particular, in some embodiments, locking is typically fast when there is no contention for the lock (that is, the lock is not being held by another computer entity). Locking operations are also typically fast when the same computer entity, for example, the same thread, performs multiple lock operations on the same lock before the thread frees the lock. Multiple lock operations before the lock is freed can occur if the thread executes recursive code.

In some embodiments, the above advantages are achieved as follows. A computer processor includes a number of register pairs (LOCKADDR, LOCKCOUNT). Each LOCKADDR register is to hold a value that identifies a lock for a computer resource. In some embodiments, this value is a reference to a locked object. Thus, in some embodiments, the value is an address of a locked object. The corresponding LOCKCOUNT register holds the count of lock instructions associated with the lock identified by the LOCKADDR register. When a thread issues a lock instruction for the lock identified by the LOCKADDR register, the computer processor increments the corresponding LOCKCOUNT register. When the thread issues an unlock instruction, the computer processor decrements the corresponding LOCKCOUNT register.

In some embodiments, the processor is suitable for executing the lock and unlock instructions of the Java Virtual Machine. The Java Virtual Machine is described, for example, in T. Lindholm, F. Yellin, "The Java™ Virtual Machine Specification" (1997). In the Java Virtual Machine, each object has a monitor associated with it. When a thread executes a lock instruction "monitorenter", a counter associated with the corresponding monitor is incremented. When the thread executes the unlock instruction "monitorexit", the counter is decremented. In some embodiments, the counters are implemented using the LOCKCOUNT registers.

In some embodiments, the LOCKCOUNT registers are omitted, and the lock for a resource is freed on any unlock instruction issued for the resource.

In some embodiments, each object includes a header which is a pointer to a class structure. The class structure is aligned on a 4-byte boundary, and hence the two LSBs of the pointer are zero and need not be stored in the header. Instead, the two LSBs of the header are used to store (1) a "LOCK" bit indicating whether the object is locked, and (2) a "WANT" bit indicating whether a thread is waiting to acquire a lock for the object.

Other features and advantages of the invention are described below. The invention is defined by the appended claims.

BRIEF DESCRIPTION OF THE DRAWINGS

FIG. 4 is a block diagram showing registers used for locking operations in a processor according to the present invention.

DESCRIPTION OF PREFERRED EMBODIMENTS

Figure 1:
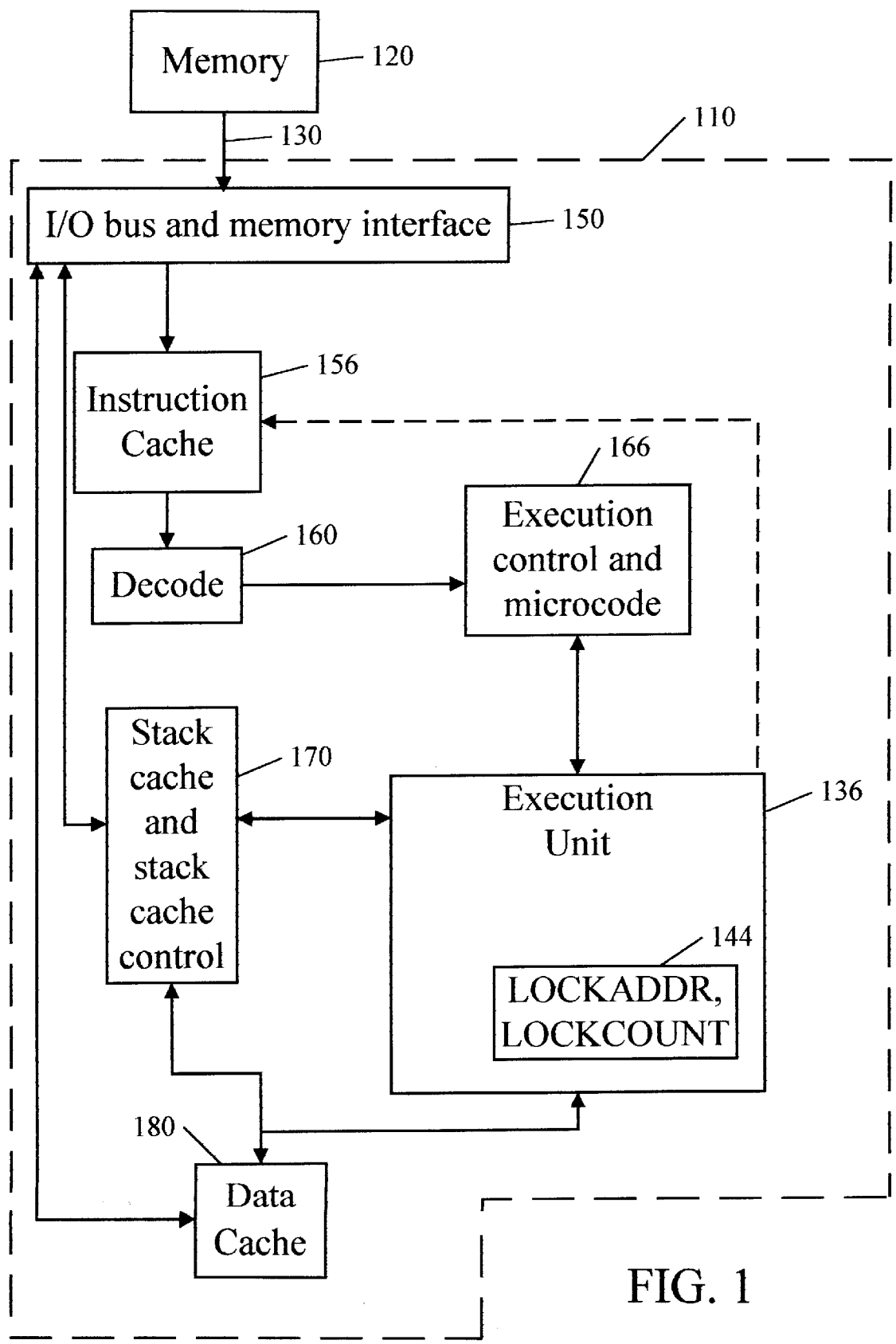
FIG. 1 is a block diagram of a computer system including a processor according to the present invention.

FIG. 1 is a block diagram of a computer system including locking circuitry. Processor 110 is connected to memory 120 by bus 130. Processor 110 includes execution unit 136 which executes instructions read from memory 120. Execution unit 136 includes registers 144 labeled LOCKADDR, LOCKCOUNT. These registers are used for object locking as described below.

Bus 130 is connected to I/O bus and memory interface unit 150 of processor 110 When processor 110 reads instructions from memory 120 interface unit 150 writes the instructions to instruction cache 156. Then the instructions are decoded by decode unit 160. Decode unit 160 sends control signals to execution control and microcode unit 166. Unit 166 exchanges control signals with execution unit 136. Decode unit 160 also sends control signals to stack cache and stack cache control unit 170 (called "stack cache" below). Stack cache 170 exchanges control and data signals with execution unit 136 and data cache unit 180. Cache units 170 and 180 exchange data with memory 120 through interface 150 and bus 130. Execution unit 136 can flush instruction cache 156, stack cache 170 and data cache 180.

Figure 2:
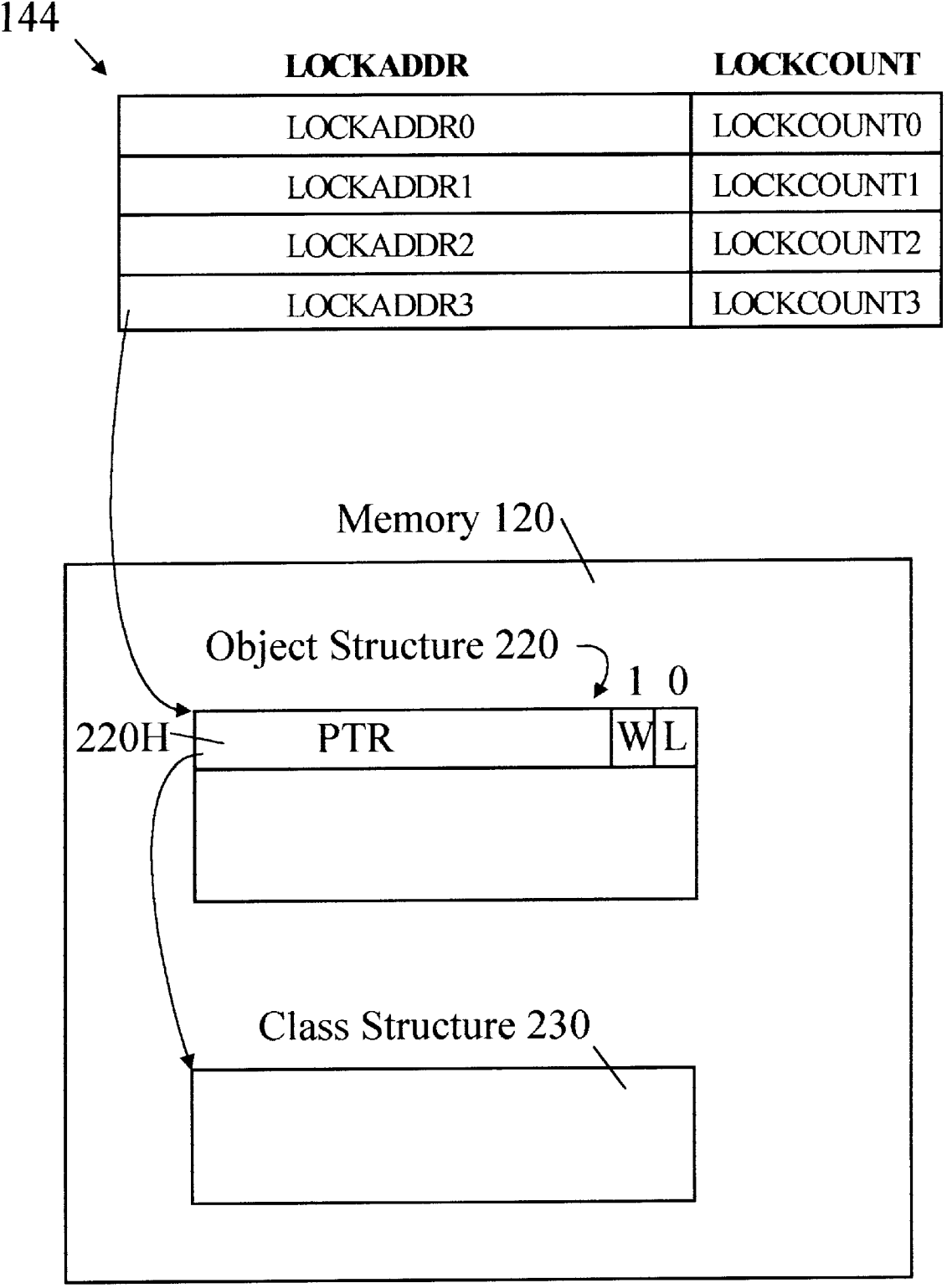
FIG. 2 is a block diagram showing registers that are used for locking operations in the processor of FIG. 1, and also showing related data structures in the memory of the system of FIG. 1.

FIG. 2 illustrates registers 144 and one of the corresponding objects in memory 120. Registers 144 include four register pairs labeled LOCKADDR0/LOCKCOUNT0 through LOCKADDR3/LOCKCOUNT3. Each LOCKADDR register is to hold an address of a locked object. In the embodiment being described, each address is 32 bits wide, and accordingly each LOCKADDR register is 32 bits wide. However, in some embodiments, each object starts on 4-byte boundary. Therefore, in some embodiments the two least significant bits of the object's address are zero, and are omitted from registers LOCKADDR. In such embodiments, each register LOCKADDR is 30 bits wide.

If a LOCKADDR register contains 0, this means the register pair is unused.

In each register pair, the LOCKCOUNT register holds the count of lock instructions for the object whose address is held in the corresponding LOCKADDR register. The LOCKCOUNT register holds the number of those lock instructions for which a corresponding unlock instruction has not issued. The LOCKCOUNT register is incremented on each lock instruction for the object, and is decremented on each unlock instruction. The lock is actually freed only when the LOCKCOUNT register is decremented to zero. (However, in some embodiments, the LOCKCOUNT register holds only a portion of the lock count, as described below. The lock is freed when the entire lock count is decremented to zero.) In some embodiments, each LOCKCOUNT register is 8 bits wide, to hold a number between 0 and 255.

Multiple lock instructions without intervening unlock instructions may be a result of recursive code. Because the LOCKCOUNT registers keep the net count of the lock and unlock instructions for the objects (that is, the difference between the numbers of the lock instructions and the unlock instructions for the object), software programs are relieved from the need to do a test before each unlock instruction to determine whether the object was locked by some other part of the thread and should therefore remain locked until the need for,that lock has expired.

In some embodiments, registers 144 keep lock addresses and counts for one thread or one computer process only. When processor 110 switches to a different thread or process, registers 144 are loaded with lock data (lock addresses and counts) for the new thread or process which is to be executed.

FIG. 2 illustrates an object whose address is stored in a LOCKADDR register (register LOCKADDR3 in FIG. 2). In FIG. 2, the object is shown stored in memory 120. However, all or part of the object can be stored in data cache 180. Throughout this description, when we describe storing data or instructions in memory 120, it is to be understood that the data or instructions can be stored in data cache 180, stack cache 170 or instruction cache 156, unless mentioned otherwise.

As shown in FIG. 2, the address in register LOCKADDR3 is a pointer to object structure 220. Object structure 220 starts with a header 220H. Header 220H is followed by other data (not shown). Header 220H includes a pointer to class structure 230 describing the object. Class structure 230 is aligned on a 4-byte boundary. As a result, and because all addresses are byte addresses with each successive byte having an address one greater than the preceding byte, the two LSBs of the class structure address are zero. These zero LSBs are not stored in header 220H. Therefore, the header has two bits not used for the address storage. These bits (header LSBs 0 and 1) are used for object locking. Bit 0, also called the L bit or the LOCK bit, is set to 1 when the object is locked. Bit 1, also called the W or WANT bit, is set to 1 when a thread is blocked waiting to acquire the lock for object 220.

Appendices A and B at the end of this description (before the claims) contain pseudocode for circuitry that executes lock and unlock instructions for one embodiment of processor 110. That circuitry is part of execution unit 136 and/or execution control and microcode unit 166. The pseudocode language of Appendices A and B is similar to the hardware description language Verilog® described, for example, in D.E. Thomas, J.P. Moorby, "The Verilog® Hardware Description Language" (1991) hereby incorporated herein by reference. The pseudocode can be easily converted to Verilog, and the corresponding circuitry can be implemented using methods known in the art.

Appendix A shows pseudocode for a lock instruction. At each of steps 1–0 through 1–3 in Appendix A, the contents of the corresponding register LOCKADDR0 through LOCKADDR3 are compared with the address of the object to be locked. If there is a match, the corresponding register LOCKCOUNT is incremented (steps 1-0a, 1-1a, 1-2a, 1-3a) and compared with zero (steps 1-0b, 1-1b, 1-2b, 1-3b). If the LOCKCOUNT register becomes 0 after incrementation, an overflow has occurred, and a trap LockCountOverflowIncrementTrap is generated. Generation of a trap terminates execution of the instruction. If the trap is enabled, processor 110 starts executing a trap handler defined for the trap. A trap handler is a computer program.

In some embodiments, the trap handler for LockCountOverflowIncrementTrap maintains a wider lock counter mLOCKCOUNT (FIG. 3) than the LOCKCOUNT register. More particularly, in some embodiments, the operating system keeps track of locked objects using tables 310 in memory 120. A separate table 310 is kept for each thread. A table 310 is created for a thread when the thread is created, and the table 310 is deallocated when the corresponding thread is destroyed.

Each table 310 includes a number of entries (mLOCKADDR, mLOCKCOUNT). The function of each entry is similar to the function of a register pair LOCKADDR/LOCKCOUNT. More particularly, mLOCKADDR holds the address of an object locked by the thread. mLOCKCOUNT holds the count of lock instructions issued by the thread for the object. The count of lock instructions is the number of the lock instructions for which a corresponding unlock instruction has not been executed. If some mLOCKADDR=0, this means the entry is unused.

A table 310 may have more than four entries. Different tables 310 may have different numbers of entries.

Each memory location mLOCKADDR is 32 or 30 bits wide in some embodiments. Each location mLOCKCOUNT is 8 or more bits wide. In some embodiments, each location mLOCKCOUNT is 32 bits wide, and each register LOCKCOUNT is 8 bits wide.

When the operating system schedules a thread for execution, the operating system may load up to four entries from the corresponding table 310 into register pairs LOCKADDR/LOCKCOUNT. Each entry is written into a single register pair LOCKADDR/LOCKCOUNT. If mLOCKCOUNT is wider than LOCKCOUNT, the operating system writes to LOCKCOUNT as many LSBs of mLOCKCOUNT as will fit into LOCKCOUNT (8 LSBs in some embodiments). If some register pair does not receive an entry from table 310, the operating system sets the corresponding register LOCKADDR to 0 to indicate that the register pair is unused ("empty").

In some embodiments, table 310 includes a bit (not shown) for each entry to indicate whether the entry is to be written into a LOCKADDR/LOCKCOUNT register pair when the thread is scheduled for execution. In other embodiments, for each thread the operating systems keeps a list (not shown) of entries to be written to registers 144 when the thread is scheduled for execution. In some embodiments, the operating system has a bit for each entry, or a list of entries, to mark entries that have been written to LOCKADDR/LOCKCOUNT registers.

In some cases, lock and unlock instructions do not cause a trap to be generated. Therefore, the mLOCKCOUNT LSBs may be invalid, or there may be no entry in a table 310 for a lock specified by a LOCKADDR/LOCKCOUNT register pair.

When some thread T1 is preempted and another thread T2 is scheduled for execution on processor 110, the operating system writes all the non-empty LOCKADDR/ LOCKCOUNT register pairs to the table 310 of thread T1 before loading the registers from the table 310 of thread T2. If mLOCKCOUNT is wider than LOCKCOUNT, the operating system writes each LOCKCOUNT register to the LSBs of the corresponding location mLOCKCOUNT. If the current thread's table 310 does not have an entry for a lock specified by a LOCKADDR/LOCKCOUNT register pair, an entry is created by the operating system.

In some embodiments, the trap handler for LockCountOverflowTrap searches the table 310 of the current thread for the entry with mLOCKADDR containing the address of the object to be locked. If such an entry does not exist, the trap handler finds a free entry, and sets its mLOCKADDR to the address of the object to be locked and mLOCKCOUNT to zero. In either case (whether the entry existed or has just been created), the trap handler increments the mLOCKCOUNT MSBs which are not stored in the LOCKCOUNT register, and sets the LSBs to zero.

We now return to describing execution of the lock instruction by execution unit 136. In some embodiments, the comparisons of the registers LOCKADDR with the address of the object to be locked at steps 1-0 through 1-3 of Appendix A are performed in parallel by four comparators corresponding to the four registers, and the incrementation of LOCKCOUNT at steps 1-0a, 1-1a, 1-2a, 1-3a is performed using incrementors. Such comparators and incrementors are known in the art.

Execution unit 136 reads the LOCK bit (FIG. 2) from the header 220H of the object to be locked, and sets the LOCK bit to 1 to indicate that the object is locked (step 2a). This read-and-set (test-and-set) operation is an atomic operation, that is, (1) the processor will not take an interrupt until the operation is completed, and (2) in a multiprocessor environment, no other processor will be able to access the LOCK bit until the operation is completed. In some embodiments, this test-and-set operation is done in parallel with steps 1-0 through 1-3. In other embodiments, this test-and-set operation is done after steps 1-0 through 1-3, and only if none of the LOCKADDR registers contains the address of the object to be locked.

If none of the LOCKADDR registers contains the address of the object to be locked (step 2), and the LOCK bit was set before the test-and-set operation (step 2a), processor 110 generates a trap LockBusyTrap.

The trap handler for LockBusyTrap searches the table 310 of the current thread to see if the current thread holds the lock for the object. If the object address equals an address stored in mLOCKADDR in one of the entries of the table 310, the corresponding mLOCKCOUNT is incremented by the trap handler. Additionally, in some embodiments the trap handler may place the entry into a register pair LOCKADDR/LOCKCOUNT. This is desirable if the next lock or unlock instruction to be issued by the thread is likely to be for the object for which the thread issued the most recent lock instruction. If the trap handler desires to place the entry into a register pair but all the register pairs are taken by other locks, the trap handler vacates one of the register pairs by writing the register pair to the table 310. (The LOCKCOUNT register is written to the mLOCKCOUNT LSBs if mLOCKCOUNT is wider than LOCKCOUNT, as described above.)

If the current thread does not hold the lock and thus the object address does not match any of the memory locations mLOCKADDR in the corresponding table 310, the trap handler sets the WANT bit in the object header (FIG. 2) and places the thread into a queue of threads waiting to acquire this lock.

We return now to describing the execution of the lock instruction by execution unit 136. If the object's LOCK bit was not set before the test-and-set operation, steps 2b-0 through 2b-3 are executed. At each step 2b-i (i=0 through 3), a respective comparator compares the register LOCKADDR1 with zero. This comparison is performed in parallel with comparisons of steps 1-0 through 1-3 and 2. If LOCKADDR0=0 (step 2b-0), the register pair LOCKADDR0/LOCKCOUNT0 is unused. Register LOCKADDR0 is written with the address of the object being locked (step 2b-0a). The register LOCKCOUNT0 is set to 1 (step 2b-0b).

If LOCKADDR0 is not 0 but LOCKADDR1=0, then register LOCKADDR1 is written with the address of the object to be locked, and register LOCKCOUNT1 is set to 1 (steps 2b-1a, 2b-1b). If LOCKADDR0 and LOCKADDR1 are not 0 but LOCKADDR2=0, then LOCKADDR2 is written with the address of the object to be locked, and register LOCKCOUNT2 is set to 1 (steps 2b-2a, 2b-2b). If LOCKADDR0, LOCKADDR1,and LOCKADDR2 are not 0 but LOCKADDR3=0, then register LOCKADDR3 is written with the address of the object to be locked, and register LOCKCOUNT3 is set to 1 (steps 2b-3a, 2b-3b).

If none of the LOCKADDR registers is equal to 0, then the trap NoLockAddrRegsTrap is generated (step 2c). In some embodiments, the trap handler for this trap finds or creates a free entry in the table 310 of the current thread. The trap handler writes the address of the object to be locked into location mLOCKADDR of that entry, and sets the corresponding mLOCKCOUNT to 1. Additionally, the trap handler may place the table entry into a LOCKADDR/ LOCKCOUNT register pair. The old contents of the register pair are stored in the thread's table 310 before the register pair is written.

Appendix B shows pseudocode for the unlock instruction. At steps 1-0 through 1-3, the LOCKADDR registers are compared in parallel with the address of the object to be unlocked. If a match occurs, this indicates that the current thread holds the lock, and the corresponding LOCKCOUNT register is decremented by a decrementor (steps 1-0a, 1-1a, 1-2a, 1-3a) and compared with zero (steps 1-0b, 1-1b, 1-2b, 1-3b). If the LOCKCOUNT register becomes 0 after decrementation, the trap LockCountZeroDecrementTrap is generated. As described above, in some embodiments, the locations mLOCKCOUNT in tables 310 are wider than the LOCKCOUNT register. In some such embodiments, the trap handler for LockCountZeroDecrementTrap searches the corresponding table 310 for an entry whose mLOCKADDR stores the address of the object being unlocked. If such entry is found, the trap handler checks the mLOCKCOUNT location corresponding to the LOCKCOUNT register which was decremented to 0. If that mLOCKCOUNT location has a "1" in the MSBs that were not written into the LOCKCOUNT register, the object remains locked by the thread. In the mLOCKCOUNT memory location the field formed by the MSBs is decremented, and the LSBs are set to 11 . . . 1 (all 1's) and are written to the LOCKCOUNT register.

If the mLOCKCOUNT MSBs are all 0's, or if there is no entry with mLOCKADDR holding the address of the object being unlocked, then the trap handler frees the lock making it available for other threads. Freeing the lock is described in more detail below.

If the mLOCKCOUNT locations are not wider than the LOCKCOUNT registers, the trap handler need not check an mLOCKCOUNT location to determine whether the lock is to be freed.

Freeing the lock involves the following operations. The trap handler examines the WANT bit of object header 220H. If the WANT bit is set, another thread is blocking on this lock. The trap handler selects one of such threads, sets its status to runnable, and gives the lock to this thread. In particular, the trap handler writes the count of 1 into the LOCKCOUNT register. If there was a corresponding pair mLOCKADDR/mLOCKCOUNT, the trap handler writes 1 to the mLOCKCOUNT location. Alternatively, in some embodiments, the trap handler writes 0 to the mLOCKADDR location to deallocate the mLOCKADDR/mLOCKCOUNT pair. Further, if the thread receiving the lock is the only thread that has been blocking on the lock, the trap handler resets the WANT bit.

If there were no threads blocking on the lock, the trap handler writes zero to (a) the corresponding LOCKADDR register and (b) the corresponding mLOCKADDR location if one exists. In addition, the trap handler resets the LOCK bit in header 220H. Also, if the current thread's table 310 includes a non-empty entry which could not be written into the LOCKADDR/LOCKCOUNT registers because the registers were unavailable, the trap handler places one of the entries into the LOCKADDR/LOCKCOUNT register pair which is being vacated by the lock freeing operation.

If none of the LOCKADDR registers holds the address of the object to be unlocked (step 2), the LockReleaseTrap is generated. The associated trap handler searches the mLOCKADDR locations of the current thread's table 310 for the address of the object to be unlocked. If a match occurs, the corresponding location mLOCKCOUNT is decremented by the trap handler. If mLOCKCOUNT becomes 0, the lock is freed. To free the lock, the trap handler perform operations similar to those described above for the trap LockCountZeroDecrementTrap. More particularly, if the WANT bit is set, the trap handler finds another thread blocking on the lock and sets that thread's status to runnable. The trap handler sets the corresponding location mLOCKCOUNT to 1. In some embodiments, the trap handler places the mLOCKADDR/mLOCKCOUNT entry into a LOCKADDR/LOCKCOUNT register pair. If the thread receiving the lock is the only thread that has been blocking on the lock, the trap handler resets the WANT bit. If there were no threads blocking on the lock (the WANT bit was 0), the trap handler writes zero to the mLOCKADDR location and resets the LOCK bit in object header 220H.

If none of the memory locations mLOCKADDR in table 310 of the current thread holds the address of the object to be unlocked, the trap handler generates the exception IllegalMonitorStateException. In some embodiments, this exception is a Java™ throw. More particularly, in some embodiments, processor 110 executes Java™ Virtual Machine language instructions (also known as Java byte codes). The Java Virtual Machine language is described, for example, in T. Lindholm and F. Yellin, "The Java™ Virtual Machine Specification" (1997) incorporated herein by reference.

Processor 110 provides fast locking and unlocking in many of the following common situations: when there is no contention for a lock, and when a thread performs multiple lock operations on the same object before the object lock is freed. More particularly, when a lock instruction is issued, in many cases the object has not been locked by another thread (that is, no contention occurs). If the object has already been locked by the same thread that has now issued the lock instruction, in many cases the address of the object is already in a LOCKADDR register because in many cases the thread does not hold more than four locks at the same time and all the locked object addresses for the thread are in the LOCKADDR registers. Even if not all the locked object addresses are in the LOCKADDR registers, there is a possibility that the address of the object specified by the lock instruction is in a LOCKADDR register. In many such cases, the locking operation requires incrementing the corresponding LOCKCOUNT register (Appendix A, steps 1-ia where i=0, 1, 2, 3), which is a fast operation in many embodiments. If the incrementation does not lead to an overflow, no trap will be generated.

Locking is also fast when the object has not been locked by any thread (including the thread issuing the lock instruction) if one of the register pairs LOCKADDR/LOCKCOUNT is unused. In such cases, the object is locked in one of steps 2b-0 through 2b-3 (Appendix A). Again, no trap is generated.

Similarly, in an unlock instruction, in many cases the address of the object to be unlocked will be in one of the LOCKADDR registers. If the corresponding LOCKCOUNT register is decremented to a non-zero value, no trap is generated.

In some embodiments, processor 110 is a microprocessor of type "picoJava I" whose specification is produced by Sun Microsystems of Mountain View, Calif. This microprocessor executes Java Virtual Machine instructions. The lock instruction is the "monitorenter" instruction of the Java Virtual Machine instruction set or the "enter_sync_method" instruction of the processor "picoJava I". The "enter_sync_method" instruction is similar to "monitorenter" but the "enter_sync_method" instruction takes as a parameter a reference to a method rather than an object. "Enter_sync_method" locks the receiving object for the method and invokes the method. The unlock instruction is the "monitorexit" instruction of the Java Virtual Machine instruction set or the return instruction from a method referenced in a preceding "enter_sync_method" instruction.

Some embodiments of processor 110 include more or less than four LOCKADDR/LOCKCOUNT register pairs.

Figure 3:
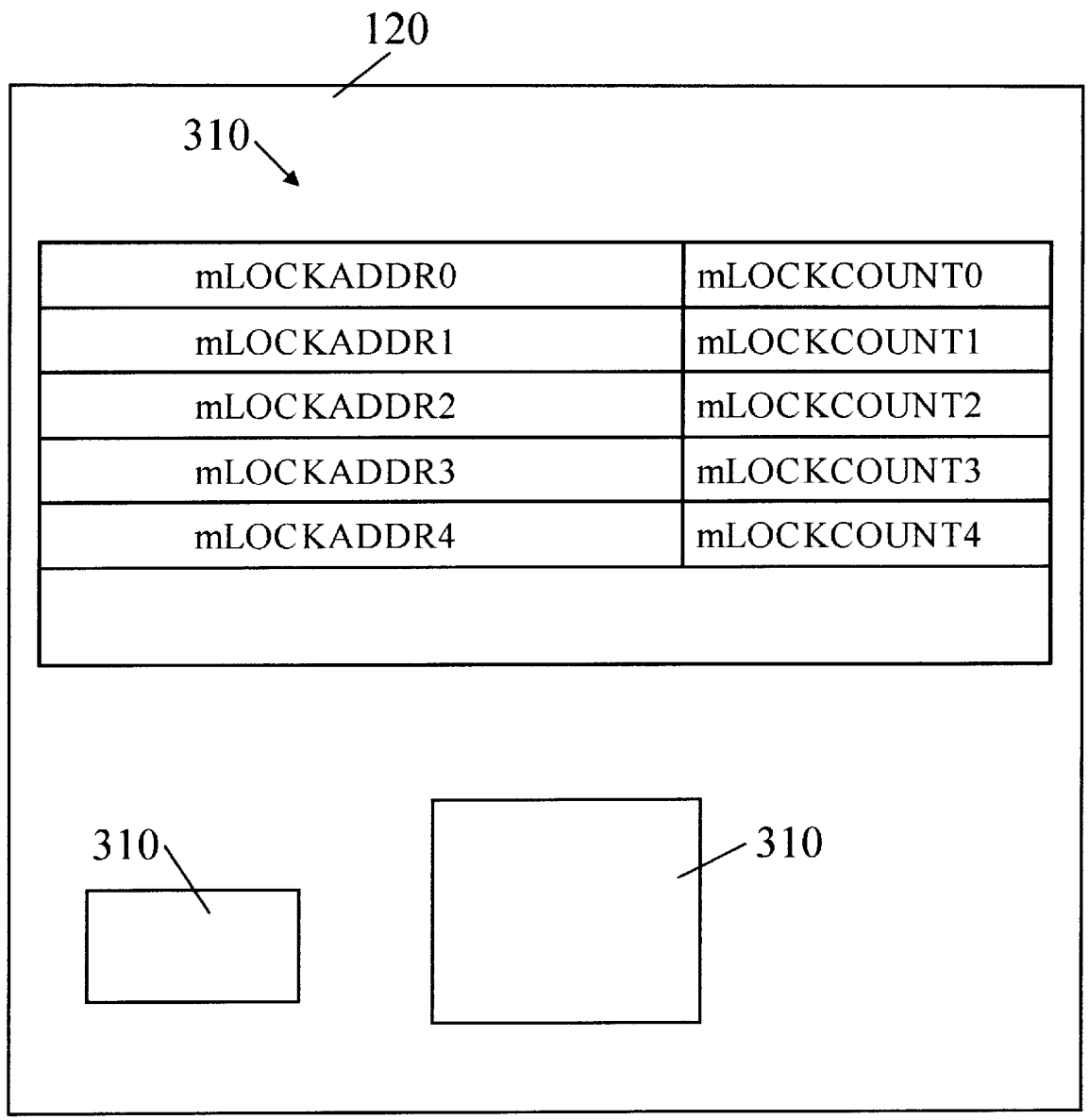
FIG. 3 is a block diagram showing data structures in the memory of FIG. 1.

In some embodiments, registers 144 include register triples (THREAD_ID, LOCKADDR, LOCKCOUNT) as shown in FIG. 4. In each triple, the register THREAD_ID identifies the thread which holds the lock recorded in the register pair LOCKADDR/LOCKCOUNT. When a lock or unlock instruction is issued, execution unit 136 examines only those LOCKADDR/LOCKCOUNT pairs for which the register THREAD_ID holds the ID of the current thread. In other respects, the execution of lock and unlock instructions is similar to the case of FIG. 2. The structure of FIG. 4 makes it easier to keep the locked objects' addresses and lock counts in registers 144 for different threads at the same time. In some embodiments used with the structure of FIG. 4, the operating system does not reload the registers 144 when a different thread becomes scheduled for execution. The operating system maintains a table 310 for each thread as shown in FIG. 3. When a register triple needs to be vacated, the corresponding LOCKADDR/LOCKCOUNT values are written to the corresponding table 310. When a table entry is placed into a register pair LOCKADDR/LOCKCOUNT, the corresponding register THREAD_ID is written with the ID of the corresponding thread.

The processors of FIGS. 1–4 are suitable for efficient implementation of the Java Virtual Machine lock and unlock instructions "monitorenter" and "monitorexit". The counters associated with the object monitors in Java can be implemented using registers LOCKCOUNT.

In some embodiments, registers LOCKCOUNT and locations mLOCKCOUNT are omitted. The processor does not keep track of the lock counts, and the processor frees a lock on any unlock instruction corresponding to the lock. The processor operation is similar to the operation described above in connection with appendices A and B. However, in Appendix A, steps 1-0 through 1-3b are omitted. Steps 2b-0b, 2b-1b, 2b-2b, and 2b-3b (LOCKCOUNT operations) are also omitted. In Appendix B, step 1-0a is omitted, and at step 1-0b the trap LockCountZeroDecrementTrap is generated unconditionally. The same applies to steps 1-1a and 1-1b, 1-2a and 1-2b, 1-3a and 1-3b.

In some embodiments, each LOCKCOUNT register is 1-bit wide, and the processor frees a lock on any unlock instruction corresponding to the lock.

The above embodiments illustrate but do not limit the invention. The invention is not limited by any particular processor architecture, the presence or structure of caches or memory, or the number of bits in any register or memory location. The invention is not limited to any particular types of objects that can be locked or unlocked. An object can represent any computer resource, including such resources as data, critical code sections, hardware, or any combination of the above. Some embodiments create an object dedicated to represent a computer resource for locking and unlocking operations. While in embodiments described above an unused register pair LOCKADDR/LOCKCOUNT is identified by zero in the LOCKADDR register, in some embodiments an unused register pair is identified by some non-zero value in the LOCKADDR register, or by some value in the LOCKCOUNT register, or, for the embodiment of FIG. 4, by some value in the THREAD_ID register, or by a combination of values in the LOCKADDR/LOCKCOUNT register pair and/or in any two or three of the LOCKADDR/LOCKCOUNT/THREAD_ID registers, or by a separate bit. A similar statement is true for unused mLOCKADDR/mLOCKCOUNT locations. In some embodiments, some or all of the operations described above as performed by trap handlers are performed by hardware instead of software. In some embodiments, some operations described above as performed by hardware are performed by software instead of hardware. The invention is not limited to addresses being byte addresses. Other embodiments and variations are within the scope of the invention, as defined by the appended claims.

APPENDIX A

Lock Instruction

```
1-0.     if (LOCKADDR0 == address of object to be locked)
         {
1-0a.    LOCKCOUNT0++;
1-0b.    if (LOCKCOUNT0 == 0) /* LOCKCOUNT0
         overflowed*/
             LockCountOverflowIncrementTrap;
         }
1-1.     if (LOCKADDR1 == address of object to be locked)
         {
1-1a.    LOCKCOUNT1++;
1-1b.    if (LOCKCOUNT1 == 0) /* LOCKCOUNT1
overflowed*/
             LockCountOverflowIncrementTrap;
         }
1-2.     if (LOCKADDR2 == address of object to be locked)
         {
1-2a.    LOCKCOUNT2++;
1-2b.    if (LOCKCOUNT2 == 0) /* LOCKCOUNT2
overflowed*/
             LockCountOverflowIncrementTrap;
```

APPENDIX A-continued

Lock Instruction

```
         }
1-3.     if (LOCKADDR3 == address of object to be locked)
         {
1-3a.    LOCKCOUNT3++;
1-3b.    if (LOCKCOUNT3 == 0) /* LOCKCOUNT3
overflowed*/
             LockCountOverflowIncrementTrap;
         }
2.       if (none of LOCKADDR0, LOCKADDR1, LOCKADDR2,
         LOCKADDR3 is equal to address of object to be
         locked)
         {
2a.      Test the LOCK bit in the object header, and
         set the LOCK bit to 1. (This test-and-set
         operation is an atomic operation.)
         if (the LOCK bit was set before the test-and-
         set operation)
             LockBusyTrap;
2b-0.    else if (LOCKADDR0 == 0) /* LOCKADDR0 unused
         */
         {
2b-0a.   LOCKADDR0 = address of object to be
         locked;
2b-0b.   LOCKCOUNT0 = 1;
         }
2b-1.    else if (LOCKADDR1 == 0) /* LOCKADDR1 unused
         */
         {
2b-1a.   LOCKADDR1 = address of object to be
         locked;
2b-1b.   LOCKCOUNT1 = 1;
         }
2b-2.    else if (LOCKADDR2 == 0) /* LOCKADDR2 unused
         */
         {
2b-2a.   LOCKADDR2 = address of object to be
         locked;
2b-2b.   LOCKCOUNT2 = 1;
         }
2b-3.    else if (LOCKADDR3 == 0) /* LOCKADDR3 unused
         */
         {
2b-3a.   LOCKADDR3 = address of object to be
         locked;
2b-3b.   LOCKCOUNT3 = 1;
         }
2c.      else NoLockAddrRegsTrap;
         }
```

APPENDIX B

Unlock Instruction

```
1-0.     if (LOCKADDR0 == address of object to be unlocked)
         {
1-0a.    LOCKCOUNT0--;
1-0b.    if (LOCKCOUNT0 == 0)
             LockCountZeroDecrementTrap;
         }
1-1.     if (LOCKADDR1 == address of object to be unlocked)
         {
1-1a.    LOCKCOUNT1--;
1-1b.    if (LOCKCOUNT1 == 0)
             LockCountZeroDecrementTrap;
         }
1-2.     if (LOCKADDR2 == address of object to be unlocked)
         {
1-2a.    LOCKCOUNT2--;
1-2b.    if (LOCKCOUNT2 == 0)
             LockCountZeroDecrementTrap;
         }
1-3.     if (LOCKADDR3 == address of object to be unlocked)
         {
1-3a.    LOCKCOUNT3--;
```

APPENDIX B-continued

Unlock Instruction

| | |
|---|---|
| 1-3b. | if (LOCKCOUNT3 == 0) <br>     LockCountZeroDecrementTrap; <br> } |
| 2. | if (none of LOCKADDR0, LOCKADDR1, LOCKADDR2, LOCKADDR3 is equal to address of object to be unlocked) <br>     LockReleaseTrap |

We claim:

1. A computer processor comprising:

one or more registers R1 for holding values that identify locks for computer resources, wherein each register R1 is modifiable by a locking operation only if the locking operation is performed by a computer entity which is being executed by said computer processor and which is capable to hold a lock for a computer resource; and circuitry for performing a locking operation to lock a computer resource, an unlocking operation to unlock a computer resource, or for performing both locking and unlocking operations, the circuitry being for receiving a value V1 identifying a lock for a computer resource, and for determining whether a register R1 holds the value V1 as an indication that the resource is locked by the computer entity being executed by the processor.

2. The computer processor of claim 1 wherein each register R1 is to hold a value identifying a locked computer resource.

3. The computer processor of claim 1 wherein in a locking operation if the circuitry has not located any register R1 holding the value V1 as an indication that the resource is locked by the computer entity being executed by the processor, the circuitry is to locate a free register R1 not used to identify a lock for any computer resource, and the circuitry is to store the value V1 in the free register R1.

4. The computer processor of claim 3 wherein in a locking operation if the circuitry has not located any register R1 holding the value V1 as an indication that the resource is locked by the computer entity being executed by the processor, the circuitry is to determine whether the computer resource is locked, and the circuitry is to store the value V1 in a free register R1 only if the computer resource is unlocked.

5. The computer processor of claim 4 wherein in a locking operation if the circuitry has not located any register R1 holding the value V1 as an indication that the resource is locked by the computer entity being executed by the processor, and the circuitry has not located a free register R1 not used to identify a lock for any computer resource, and the computer resource subject of the locking operation is unlocked, the circuitry is to generate a trap for the computer processor.

6. The computer processor of claim 4 wherein in a locking operation if the circuitry has not located any register R1 holding the value V1 as an indication that the resource is locked by the computer entity being executed by the processor, the circuitry is to generate a trap for the computer processor if the resource is locked.

7. The computer processor of claim 4 wherein:

the computer resource comprises object data which comprise a field storing information identifying an address of a portion of the object data, wherein the portion of the object data is for being stored on a two-byte boundary, and wherein the field has a size of a computer address but the field is to store less than all the bits of the address of the portion of the object data so that fewer than all the bits of the field are to be used to store the address of the portion of the object data, and wherein one or more bits of the field that are not used to store the address of the portion of the object data are for indicating whether the object is locked, and wherein to determine whether the resource is locked the circuitry is to read one or more of the bits for indicating whether the object is locked.

8. The computer processor of claim 1 wherein in an unlocking operation if the circuitry has not located any register R1 holding the value V1 as an indication that the resource is locked by the computer entity being executed by the processor, the circuitry is to generate a trap for the computer processor.

9. The computer processor of claim 1 further comprising one or more registers R2 for holding values representing counts associated with locks identified by registers R1, each count being a count of lock instructions which have issued for a resource but for which a corresponding unlock instruction has not issued, wherein in at least one of the locking or unlocking operations the circuitry modifies a register R2 if any register R1 holds the value V1 as an indication that the resource is locked by the computer entity being executed by the processor.

10. The computer processor of claim 9 wherein modifying a register R2 comprises:

decrementing the register R2 in an unlocking operation; and generating a trap for the computer processor if the decremented register R2 holds the value zero.

11. The computer processor of claim 9 wherein modifying a register R2 comprises:

incrementing the register R2 in a locking operation; and generating a trap for the computer processor if the incremented register R2 holds the value zero.

12. The computer processor of claim 9 wherein each register R2 is to hold a count associated with a corresponding register R1.

13. A process for executing computer entities by the computer processor of claim 9, the process comprising:

the computer processor executing different computer entities; and when the computer processor switches from executing one computer entity to executing a different computer entity, loading the registers R1 and R2 with values for the entity to be executed so that the registers R1 and R2 keep values only for the entity being executed by the processor.

14. The computer processor of claim 1 further comprising, for each register R1, a register R3 to identify the executable computer entity that holds a lock identified by a value in the corresponding register R1;

wherein the circuitry determining if a register R1 holds the value V1 comprises the circuitry determining whether for any register R3 identifying the computer entity being executed by the computer processor, the corresponding register R1 holds the value V1.

15. A process for executing computer entities by the computer processor of claim 1, the process comprising:

the computer processor executing different computer entities; and when the computer processor switches from executing one computer entity to executing a different computer entity, loading the registers R1 with lock values for the entity to be executed so that the registers R1 keep lock values only for the entity being executed by the processor.

16. A circuit comprising:
one or more registers R1 for holding values that identify locks for computer resources;
circuitry for performing a locking operation to lock a computer resource, an unlocking operation to unlock a computer resource, or for performing both locking and unlocking operations, the circuitry being for receiving a value V1 identifying a lock for a computer resource, and for determining whether a register R1 holds the value V1 as an indication that the resource is locked; and
one or more registers R2 for holding values representing counts associated with locks identified by registers R1, each count being a count of lock instructions which have issued for a resource but for which a corresponding unlock instruction has not issued, wherein in at least one of the locking or unlocking operations the circuitry modifies a register R2 if a register R1 holds the value V1 as an indication that the resource is locked.

17. The circuit of claim 16 wherein modifying a register R2 comprises incrementing the register R2 in a locking operation.

18. The circuit of claim 16 wherein the circuitry comprises:
a comparator for comparing the value V1 with each value held in the one or more registers R1; and
an incrementor for incrementing the value in a register R2.

19. The circuit of claim 16 wherein the circuitry comprises:
a comparator for comparing the value V1, with each of one or more values held in the one or more registers R1; and
a decrementor for decrementing the value in a register R2.

20. The circuit of claim 16 wherein in a locking operation when the circuitry has not located any register R1 holding the value V1, the circuitry is to locate a free register R1 not used to identify a lock for any computer resource, and the circuitry is to store the value V1 in the free register R1.

21. The circuit of claim 20 wherein when the circuitry has not located any register R1 holding the value V1, the circuitry is to determine whether the computer resource is locked, and the circuitry is to store the value V1 in a free register R1 only if the computer resource is unlocked.

22. The circuit of claim 16 wherein in a locking operation when the circuitry has not located any register R1 holding the value V1, the circuitry is to locate a free register R1 not used to identify a lock for any computer resource, and the circuitry is to store the value V1 in the free register R1 and to store a predetermined value in a register R2.

23. The circuit of claim 22 wherein when the circuitry has not located any register R1 holding the value V1, the circuitry is to determine whether the computer resource is locked, and the circuitry is to store the value V1 in a free register R1 only if the computer resource is unlocked.

24. The circuit of claim 16 wherein the circuit comprises a computer processor.

25. The circuit of claim 16 wherein each register R2 is to hold a count associated with a corresponding register R1.

26. A circuit comprising:
one or more registers R1 for holding values that identify locks for computer resources;
circuitry for performing a locking operation to lock a computer resource, an unlocking operation to unlock a computer resource, or for performing both locking and unlocking operations, the circuitry being for receiving a value V1 identifying a lock for a computer resource, and for determining whether any register R1 holds the value V1; and
one or more registers R2 for holding values representing counts associated with locks identified by registers R1, wherein in at least one of the locking or unlocking operations the circuitry modifies a register R2 if any register R1 holds the value V1,
wherein modifying a register R2 comprises decrementing the register R2 in an unlocking operation.

27. A process for performing a locking or unlocking operation on a computer resource by a computer processor which has one or more registers R1 to hold values identifying locks for computer resources, the process comprising:
a circuitry receiving a value V1 identifying a lock for a computer resource; and
the circuitry determining if a register R1 holds the value V1 as in indication that the computer resource is locked, wherein each register R1 is modifiable by a locking operation only if the locking operation is performed by a computer entity which is being executed by said computer processor and which is capable to hold a lock for a computer resource.

28. The process of claim 27 wherein the process is for performing a locking operation, and wherein if no register R1 holds the value V1, the process comprises determining if one of the one or more registers R1 is unused, and if so then storing the value V1 in an unused register R1.

29. The process of claim 27 further comprising, in a locking operation, if no register R1 holds the value V1 to indicate that the computer entity already holds a lock for the computer resource, but a free register R1 exists which is not used to identify a lock for any computer resource, then writing the value V1 into the register R1 to indicate that the computer entity holds a lock for the computer resource.

30. The process of claim 29 further comprising, in an unlocking operation, receiving from a computer entity a value V1 identifying a lock held by the computer entity, and determining whether any register R1 holds the value V1 as an indication that the computer entity holds the lock for the resource.

31. A process for performing a locking or unlocking operation on a computer resource, the process comprising:
a circuitry receiving a value V1 identifying a lock for a computer resource;
the circuitry determining if one of one or more predetermined registers R1 hold the value V1; and
modifying a register R2 to update a count associated with the lock identified by the value V1 if a register R1 holds the value V1, the count being a count of lock instructions which have issued for a resource but for which a corresponding unlock instruction has not issued.

32. A computer readable storage medium storing computer object data, the object data comprising a field storing information identifying an address of a portion of the object data, wherein the portion of the object data is for being stored on a two-byte boundary, and wherein the field has a size of a computer address but the field stores less than all the bits of the address of the portion of the object data so that fewer than all the bits of the field are used to store the address of the portion of the object data,
the computer readable storage medium comprising one or more computer instructions for accessing the object data, wherein one or more bits of the field that are not used to store the address of the portion of the object data are to be used by the computer instructions for indicating whether the object is locked.

33. The computer readable storage medium of claim 32 wherein the portion of the object data is for being stored on a four-byte boundary, and wherein the field has at least two bits not used to store the address of the portion of the object data, and wherein the one or more bits of the field that are not used to store the address of the portion of the object data include a bit to be used by the computer instructions for indicating whether a computer entity wants to acquire a lock for the object.

34. The computer readable storage medium of claim 32 in combination with a computer processor operable to access the computer readable storage medium and to execute said computer instructions.

35. A computer processor comprising:
one or more registers R1 for holding values that identify locks for computer resources; and
circuitry for performing a locking operation to lock a computer resource, an unlocking operation to unlock a computer resource, or for performing both locking and unlocking operations, the circuitry being for receiving a value V1 identifying a lock for a computer resource, and for determining whether a register R1 holds the value V1 as an indication that the resource is locked,
wherein the registers R1 are part of an instruction execution unit of the computer processor.

36. The computer processor of claim 35 wherein each register R1 is to hold a value identifying a locked computer resource.

37. The computer processor of claim 35 wherein in a locking operation if the circuitry has not located any register R1 holding the value V1 as an indication that the resource is locked, the circuitry is to locate a free register R1 not used to identify a lock for any computer resource, and the circuitry is to store the value V1 in the free register R1.

38. The computer processor of claim 37 wherein in a locking operation if the circuitry has not located any register R1 holding the value V1 as an indication that the resource is locked, the circuitry is to determine whether the computer resource is locked, and the circuitry is to store the value V1 in a free register R1 only if the computer resource is unlocked.

39. The computer processor of claim 38 wherein in a locking operation if the circuitry has not located any register R1 holding the value V1 as an indication that the resource is locked, and the circuitry has not located a free register R1 not used to identify a lock for any computer resource, and the computer resource subject of the locking operation is unlocked, the circuitry is to generate a trap for the computer processor.

40. The computer processor of claim 38 wherein in a locking operation if the circuitry has not located any register R1 holding the value V1 as an indication that the resource is locked, the circuitry is to generate a trap for the computer processor if the resource is locked.

41. The computer processor of claim 38 wherein:
the computer resource comprises object data which comprise a field storing information identifying an address of a portion of the object data, wherein the portion of the object data is for being stored on a two-byte boundary, and wherein the field has a size of a computer address but the field is to store less than all the bits of the address of the portion of the object data so that fewer than all the bits of the field are to be used to store the address of the portion of the object data, and wherein one or more bits of the field that are not used to store the address of the portion of the object data are for storing information indicating whether the object is locked, and
wherein to determine whether the resource is locked, the circuitry is to read one or more of the bits for storing information indicating whether the object is locked.

42. The computer processor of claim 35 wherein in an unlocking operation if the circuitry has not located any register R1 holding the value V1 as an indication that the resource is locked, the circuitry is to generate a trap for the computer processor.

43. The computer processor of claim 35 further comprising one or more registers R2 for holding values representing counts associated with locks identified by registers R1, each count being a count of lock instructions which have issued for a resource but for which a corresponding unlock instruction has not issued, wherein in at least one of the locking or unlocking operations the circuitry modifies a register R2 if any register R1 holds the value V1 as an indication that the resource is locked.

44. The computer processor of claim 43 wherein modifying a register R2 comprises:
decrementing the register R2 in an unlocking operation; and
generating a trap for the computer processor if the decremented register R2 holds the value zero.

45. The computer processor of claim 43 wherein modifying a register R2 comprises:
incrementing the register R2 in a locking operation; and
generating a trap for the computer processor if the incremented register R2 holds the value zero.

46. The computer processor of claim 43 wherein each register R2 is to hold a count associated with a corresponding register R1.

47. The computer processor of claim 35 further comprising, for each register R1, a register R3 to identify an executable computer entity that holds a lock identified by a value in the corresponding register R1.

48. A process for executing computer entities by the computer processor of claim 35, the process comprising:
the computer processor executing different computer entities; and
when the computer processor switches from executing one computer entity to executing a different computer entity, loading the registers R1 with lock values for the entity to be executed so that the registers R1 keep lock values only for the entity being executed by the processor.

49. A process for performing locking and unlocking operations by a computer processor whose instruction execution unit comprises one or more registers R1 for holding values that identify locks for computer resources, the process comprising, in a locking operation:
receiving a value V1 identifying a lock for a computer resource;
determining whether any register R1 in the instruction execution unit of the processor holds the value V1 as an indication that the resource is locked;
if no register R1 holds the value V1 as an indication that the resource is locked, but a free register R1 exists which is not used to identify a lock for any computer resource, then writing the value V1 into the register R1 to indicate that the resource is locked.

50. The process of claim 49 further comprising, in an unlocking operation, receiving a value V2 identifying a lock for a computer resource, and determining whether any register R1 holds the value V2 to indicate that the resource is locked.

51. A process for processing of computer object data which comprise a field storing information identifying an address of a portion of the object data, wherein the portion of the object data is stored on a two-byte boundary, and wherein the field has a size of a computer address, the process comprising:
   a computer storing in the field less than all the bits of the address of the portion of the object data; and
   in one or more bits of the field that are not used to store the address of the portion of the object data, the computer storing information indicating whether the object is locked.

52. The process of claim 51 wherein the potion of the object data is stored on a four-byte boundary, and wherein the field has at least two bits not used to store the portion of the object data, the process further comprising the computer storing, in one or more bits of the field that are not used to store the address of the portion of the object data, an indication whether a computer entity wants to acquire a lock for the object.

53. A process for operating a computer processor which comprises one or more locking registers R1 for storing values identifying resources locked by a computer entity being executed by the processor, the process comprising:
   the computer processor switching from one computer entity to a different computer entity; and
   when the processor switches from one computer entity to a different computer entity, loading the one or more registers R1 with values that identify resources locked by the computer entity to which the processor is switching;
   wherein the processor further comprises, for each register R1, a corresponding register R2 to hold a count associated with a resource identified by the corresponding register R1, the count being a count of lock instructions which have issued for a resource but for which a corresponding unlock instruction has not issued;
   wherein when the processor switches from one computer entity to a different computer entity, each register R2 is loaded with a count corresponding to a value being loaded into the corresponding register R1, the count being associated with the computer entity to which the processor is switching.

* * * * *